United States Patent
Steiner et al.

(10) Patent No.: US 9,139,052 B2
(45) Date of Patent: *Sep. 22, 2015

(54) TIRE LOCALIZATION SYSTEMS AND METHODS IN TIRE PRESSURE MONITORING SYSTEMS

(71) Applicant: Infineon Technologies AG, Neubiberg (DE)

(72) Inventors: Christoph Steiner, St. Margarethen (AT); Ralf Schledz, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,608

(22) Filed: Mar. 18, 2014

(65) Prior Publication Data

US 2014/0200785 A1 Jul. 17, 2014

Related U.S. Application Data

(63) Continuation of application No. 13/332,921, filed on Dec. 21, 2011, now Pat. No. 8,700,286.

(51) Int. Cl.
*B60C 23/02* (2006.01)
*B60C 23/00* (2006.01)
*B60C 23/04* (2006.01)
*B60T 8/172* (2006.01)
*G01M 17/00* (2006.01)

(52) U.S. Cl.
CPC ............. *B60C 23/00* (2013.01); *B60C 23/0416* (2013.01); *B60C 23/0454* (2013.01); *B60C 23/0462* (2013.01); *B60C 23/0488* (2013.01); *B60T 8/172* (2013.01)

(58) Field of Classification Search
CPC ............................... B60C 23/02; B01M 17/00
USPC .................................... 701/71, 34.4; 340/442
See application file for complete search history.

(56) References Cited

U.S. PATENT DOCUMENTS

| | | | | |
|---|---|---|---|---|
| 4,355,297 A | * | 10/1982 | Sinha et al. | 340/443 |
| 5,192,929 A | * | 3/1993 | Walker et al. | 340/444 |
| 5,442,331 A | | 8/1995 | Kishimoto et al. | |
| 5,670,716 A | * | 9/1997 | Tamasho et al. | 73/146.2 |
| 5,737,714 A | * | 4/1998 | Matsuno et al. | 701/89 |
| 6,204,758 B1 | | 3/2001 | Wacker et al. | |
| 6,559,634 B2 | | 5/2003 | Yamada | |
| 6,591,671 B2 | | 7/2003 | Brown | |
| 6,996,974 B2 | | 2/2006 | Anilovich et al. | |
| 7,336,161 B2 | | 2/2008 | Walraet | |
| 7,673,505 B2 | | 3/2010 | Hammerschmidt | |

(Continued)

FOREIGN PATENT DOCUMENTS

| | | |
|---|---|---|
| EP | 1832881 A3 | 9/2007 |
| WO | 2006100577 A1 | 9/2006 |
| WO | 2009060093 A1 | 5/2009 |

*Primary Examiner* — Tan Q Nguyen
(74) *Attorney, Agent, or Firm* — Infineon Technologies AG

(57) ABSTRACT

Embodiments relate to a control unit comprising a data input to receive wheel rotation data from each of a plurality of fixed wheel rotation sensors associated with a wheel of a vehicle and acceleration samples from a plurality of wheel units. The control unit includes a processor to localize each of the plurality of wheel units to a particular wheel of the vehicle from a joint processing of the wheel rotation data and the acceleration samples.

17 Claims, 4 Drawing Sheets

(56) References Cited

U.S. PATENT DOCUMENTS

| | | |
|---|---|---|
| 7,693,626 B2 | 4/2010 | Breed et al. |
| 7,930,132 B2 | 4/2011 | Watasue |
| 2002/0095253 A1 | 7/2002 | Losey et al. |
| 2002/0157461 A1 | 10/2002 | Schmidt et al. |
| 2004/0172179 A1 | 9/2004 | Miwa |
| 2004/0246117 A1 | 12/2004 | Ogawa et al. |
| 2006/0087420 A1 | 4/2006 | Walraet |
| 2006/0187014 A1 | 8/2006 | Li et al. |
| 2006/0212256 A1 | 9/2006 | Stölzl et al. |
| 2007/0240501 A1 | 10/2007 | Mancosu et al. |
| 2007/0255510 A1 | 11/2007 | Mancosu et al. |
| 2008/0196492 A1 | 8/2008 | Achterholt |
| 2009/0012740 A1 | 1/2009 | Hain et al. |
| 2009/0027183 A1 | 1/2009 | Kvisteroy et al. |
| 2009/0234591 A1 | 9/2009 | Savaresi et al. |
| 2010/0030512 A1 | 2/2010 | Hoeffel et al. |
| 2010/0302063 A1 | 12/2010 | Isomura et al. |
| 2011/0071737 A1 | 3/2011 | Greer et al. |
| 2011/0082663 A1 | 4/2011 | Geisler et al. |
| 2012/0200408 A1 | 8/2012 | Gotschlich et al. |
| 2012/0253590 A1 | 10/2012 | Fink |
| 2013/0085710 A1 | 4/2013 | Kautzsch |

* cited by examiner

TIRE LOCALIZATION SYSTEMS AND METHODS IN TIRE PRESSURE MONITORING SYSTEMS

REFERENCE TO RELATED APPLICATIONS

This application is a continuation of U.S. patent application Ser. No. 13/332,921 which was filed on Dec. 21, 2011 and claims the benefit of priority date of the above U.S. application, now U.S. Pat. No. 8,700,286 the contents of which are herein incorporated in its full entirety by reference.

TECHNICAL FIELD

The invention relates generally to tire pressure monitoring systems (TPMS) and more particularly to systems and methods for localizing individual tires on a vehicle as part of TPMS.

BACKGROUND

Tire pressure monitoring systems (TPMS) on vehicles are generally required in the U.S., with Europe and countries in Asia to follow. The legislation mandating the use of TPMS typically sets a pressure warning threshold level which is monitored by wheel-based units, or wheel modules, in direct TPMS. The wheel modules are mounted inside of each tire, such as on the rim, valve, or in-tire, in order to periodically or continuously monitor the inflation pressure of the tire.

Each wheel module typically includes a pressure sensor, control logic such as a microcontroller, a power source such as a battery, and a radio frequency (RF) transmitter that communicates information from the wheel module to a central TPMS receiver mounted elsewhere in the vehicle. Some wheel modules also comprise an acceleration sensor for determining when the vehicle is in motion in order to conserve battery life.

The process of identifying which wheel module sent a particular signal, and therefore which tire may have low pressure, is called localization. When a low pressure situation is detected, drivers generally want to know which tire is low, rather than simply that one of the tires is low, which often requires each to be checked in order to determine which tire actually needs attention. Effective and efficient localization is an on-going challenge in TPMS because tires are frequently rotated and sometimes changed out between summer and winter, altering their positions. Additionally, power constraints on the wheel modules make frequent communications and localization signal transmissions impractical.

Therefore, there is a need for improved localization techniques in TPMS systems utilizing acceleration sensors.

SUMMARY

Embodiments relate to localization of tires in tire pressure monitoring systems. In an embodiment, a tire pressure monitoring system (TPMS) comprises a plurality of fixed wheel rotation sensors each associated with a wheel of a vehicle and configured to acquire wheel rotation data; a plurality of wheel units each associated with a wheel of a vehicle and comprising an acceleration sensor configured to acquire acceleration data; and a control unit associated with vehicle and configured to receive the wheel rotation data from each of the fixed wheel rotation sensors and the acceleration data from each of the plurality of wheel units and to localize each of the plurality of wheel units to a particular wheel of the vehicle from a joint processing of the wheel rotation data and the acceleration data.

In an embodiment, a method of localizing a wheel in a tire pressure monitoring system (TPMS) comprises acquiring acceleration data at each of a plurality of wheels; acquiring wheel rotation data at each of the plurality of wheels; communicating the acceleration data and the wheel rotation data from each of the plurality of wheels to a control unit; and jointly processing the acceleration data and the wheel rotation data by the control unit to associate the acceleration data with a particular one of the plurality of wheels at which corresponding wheel rotation data was acquired.

BRIEF DESCRIPTION OF THE DRAWINGS

The invention may be more completely understood in consideration of the following detailed description of various embodiments of the invention in connection with the accompanying drawings, in which.

Figure 1:
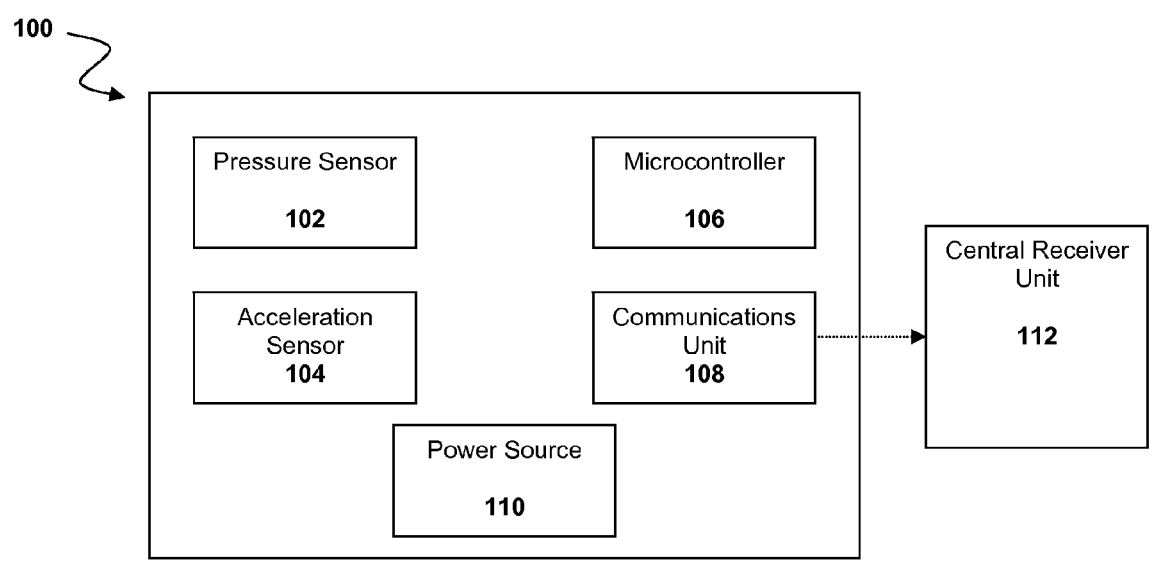
FIG. 1 is a block diagram of a tire pressure monitoring system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to tire pressure monitoring systems (TPMS). In embodiments, a TPMS comprises a wheel unit and a control unit. Each wheel unit collects acceleration data and transmits that data to the control unit for processing. The control unit processes the data and, using additional data received from another vehicle system, for example an antilock braking system (ABS) or electronic stability control (ESC) system, correlates the data in order to localize each wheel unit to a particular wheel of the vehicle. Advantages include increased processing power at the control unit as compared to the wheel unit.

FIG. 1 depicts a wheel module according to an embodiment. Wheel module 100 comprises a pressure sensor 102, an acceleration sensor 104, control circuitry such as a microcontroller 106, a communications unit 108 and a power source 110 in an embodiment.

Pressure sensor 102 is used to monitor the pressure of the tire by periodically sensing the pressure. Acceleration sensor 104 can be used to detect rotation, which helps to reduce power consumption by only taking pressure measurements when the vehicle is in motion. In embodiments, acceleration sensor 104 is a single-axis or a multi-axis acceleration sensor with sensitivity in the radial direction, orthogonal to the axis of the vehicle (see FIG. 2), though other acceleration sensors can be used in other embodiments.

Communications unit 108 comprises a radio frequency (RF) transmitter in one embodiment to transmit signals to a central receiver unit 112. In a unidirectional TPMS embodiment, module 100 is autonomous in that it transmits to but does not receive wireless communications from central receiver unit 112, reducing power consumption. In other embodiments, communications unit 108 can comprise an RF transmitter/receiver or some other wireless communications module and can be separate from (as depicted) or integrated with microcontroller 106 in embodiments. Power source 110 comprises a battery or other suitable power source in embodiments.

In embodiments, wheel module 100 can comprise more or fewer components. For example, wheel modules 100 can comprise a temperature sensor in order to provide temperature compensation. Additional sensors, such as to monitor other characteristics of the tire, wheel, and environment, can also be included in other embodiments. Further, in other embodiments, wheel module 100 may have various components located in positions discrete from the rest of components of wheel module 100, depending on the application and component.

Figure 2:
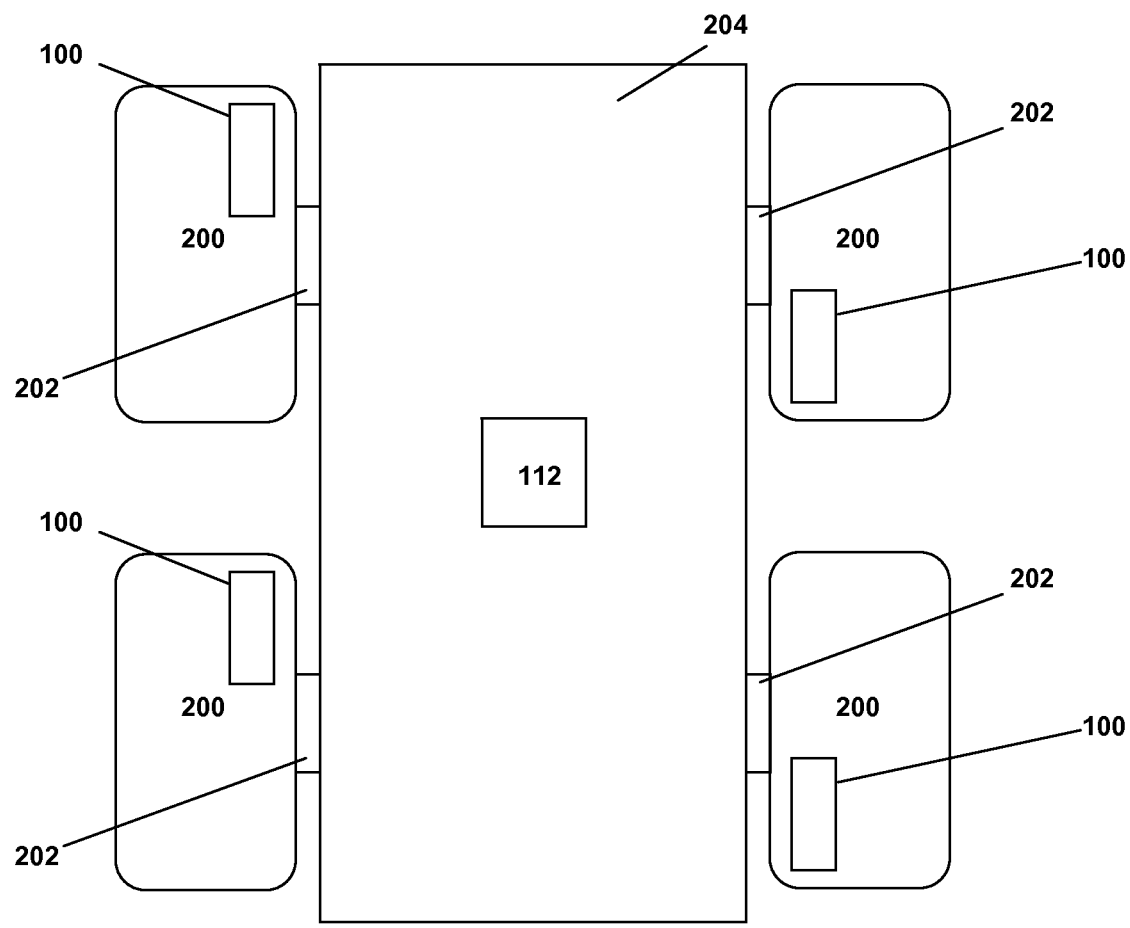
FIG. 2 is a block diagram of a vehicle according to an embodiment.

Referring to FIG. 2, wheel module 100 can be mounted in a tire 200, and each individual tire 200 is mounted to vehicle body 204 via axle 202. In embodiments, wheel module 100 can be mounted to the rim, valve stem, or in-tire. A typical passenger vehicle having four wheels will therefore have four wheel modules, one in each tire 200, as shown generally in FIG. 2, thus enabling each wheel module 100 to monitor the tire pressure of the tire associated with the wheel in which it is mounted. The mounting position of each wheel module 100 in each tire 200 can be the same or can vary in embodiments.

Figure 3:
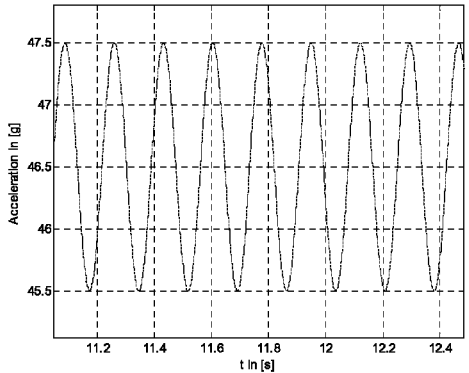
FIG. 3 is a plot of acceleration versus time according to an embodiment.

In operation, when tire 200 is rotating, acceleration sensor 104 senses the acceleration due to the centrifugal force. Sensor 104 also senses an acceleration component due to Earth's gravity field. This acceleration component oscillates as tire 200 rotates. The amplitude of this oscillating signal is 1 g=9.81 m/s$^2$. The frequency of the oscillating signal is equal to the rotations per second of tire 200. The phase angle of the oscillating signal is equal to the angular position of wheel module 100. FIG. 3 depicts a typical acceleration signal with an oscillating signal on top of a constant acceleration value due to the centrifugal force. In the example depicted in FIG. 3, tire 200 is rotating with a constant frequency, i.e. the vehicle is driving with constant speed.

Figure 4A:
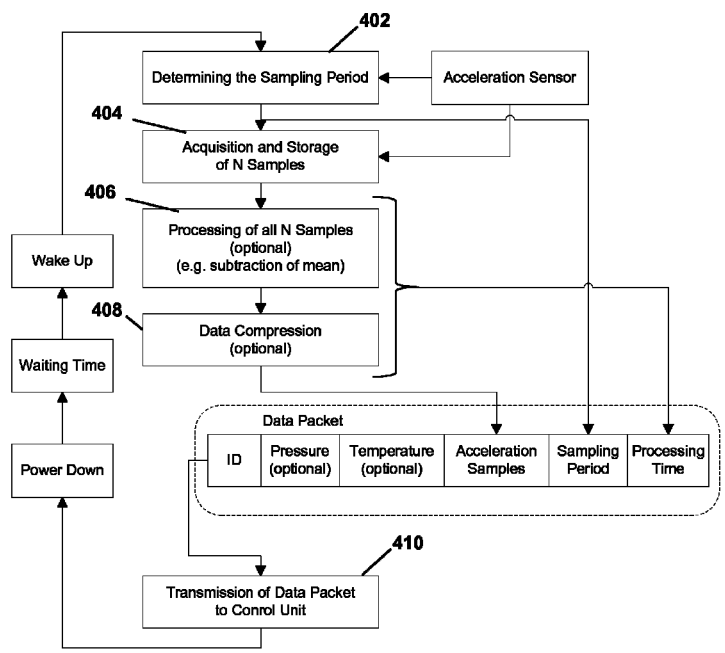
FIG. 4A is a flowchart according to an embodiment.

Referring to FIG. 4A, each wheel module 100 is configured to carry out various tasks and functions during operation.

First, at 402, the sampling period for the acquisition of N (N>1) acceleration samples is determined. In an embodiment, the sampling period is determined based on a single centrifugal acceleration sample from acceleration sensor 104. The centrifugal acceleration, as previously mentioned, depends on the rotational speed of tire 200 and, thus, is related to the frequency of the oscillating signal due to Earth's gravity field.

In another embodiment, the sampling period can be found by a sampling chirp. First, some number of samples are acquired with an initially very small sampling period. These samples are evaluated by a criterion, which should find out whether a sufficient part (e.g., half a period) of the oscillating signal is observed. If the criterion is fulfilled, then the sampling period is found. If the criterion is not fulfilled, the sampling period is increased, some number of samples are acquired and the criterion is checked again.

After determining the sampling period, wheel module 100 is configured to acquire, digitize and store N acceleration samples at 404.

At 406, optional processing of all N acceleration samples takes place. In an embodiment, the mean (DC) component of the oscillating signal, which is due to the centrifugal acceleration, can be subtracted.

At 408, optional data compression can be carried out. To minimize the number of bits for wireless data transmission, the acceleration samples can be compressed. Compression can be done on a sample-by-sample basis or jointly considering all N samples. In one embodiment, the acceleration samples are compressed by keeping only the sign information, i.e. compression, to one bit per acceleration sample. Prior to this compression, a mean subtraction at 406 can be required.

At 410, a data packet including wheel module identification; pressure, temperature and/or acceleration or other sensor samples; sampling period; and processing time is transmitted via a radio frequency communication link to control unit 112. The processing time is the elapsed time between the end of acquisition and data transmission.

Central receiver or control unit 112 is located in the vehicle body and powered by the vehicle power supply in an embodiment. At least for this reason, control unit 112 has much more processing power than wheel modules 100. Control unit 112 is configured in embodiments to receive data packets from wheel units 100, to register a time of reception of each data packet and to further process the data in the data packet. Control unit 112 also has access in embodiments to data from fixed wheel rotation sensors, such as sensors from anti-lock brake systems (ABS) or electronic stability control (ESC). Data from the ABS and/or ESC includes time stamps and can be stored in control unit 112 as long as is required.

Figure 4B:
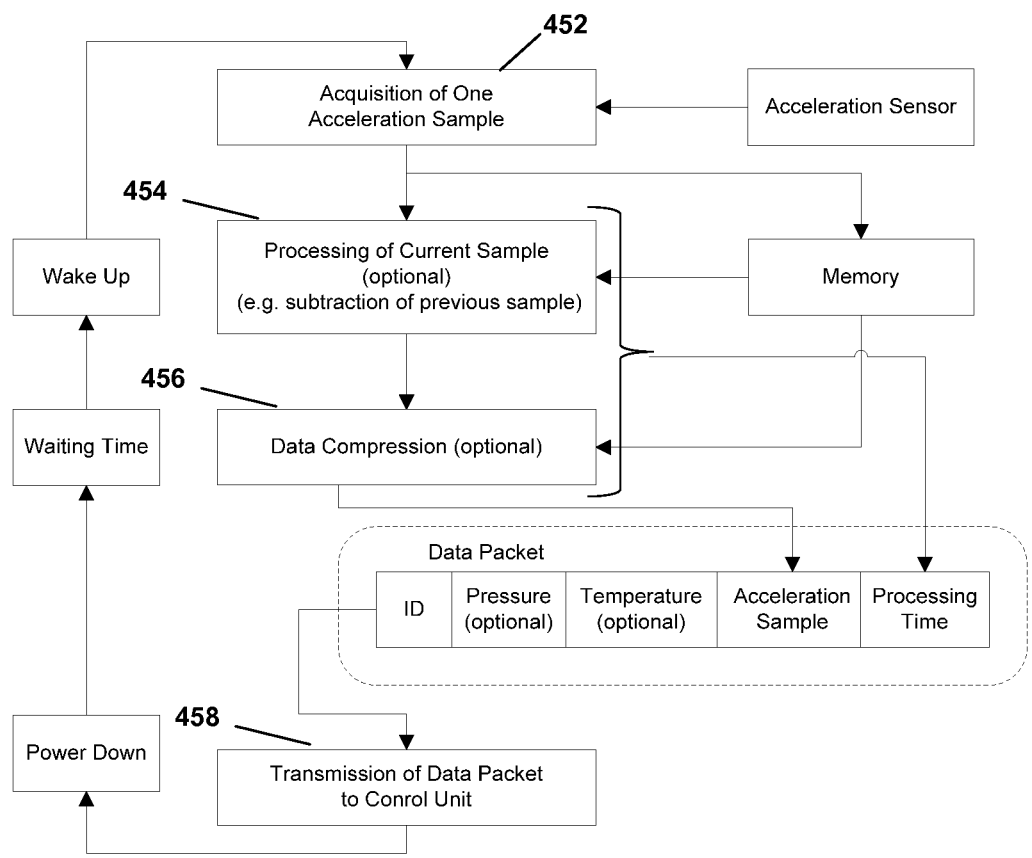
FIG. 4B is a flowchart according to an embodiment.

Another embodiment is depicted in FIG. 4B, in which wheel unit 100 is configured to transmit a single acceleration sample per data packet. In the embodiment of FIG. 4B, a single acceleration sample is acquired during the wake-up period at 452. Previously stored acceleration samples can be used to process the current sample at 454. For example, the difference between current and previous acceleration samples can be calculated. After optional compression at 456, the data packet is sent to control unit 112 at 458.

Next, control unit 112 receives the data packet and registers the time of reception. The time of acquisition of the acceleration sample, t0, is computed by subtracting the processing time and the time required for data transmission from the time of reception. The ABS or ESC data at the time of acquisition, t0, is obtained. Then, the acceleration sample and the corresponding ABS or ESC data are stored with the time stamp. Each new TPMS data packet provides additional data. After a certain number of TPMS data packets are received, the correlation of all stored values is calculated.

Figure 5:
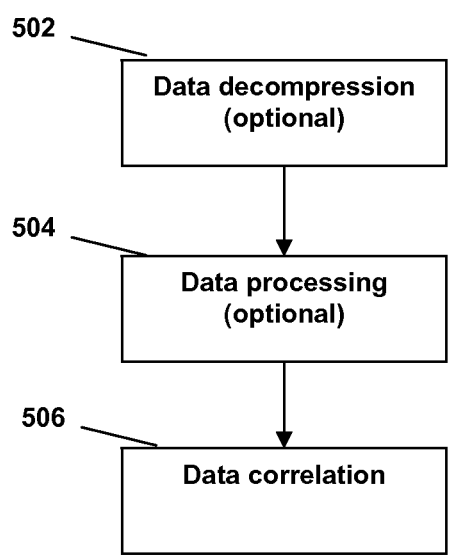
FIG. 5 is a flowchart according to an embodiment.

Referring to FIG. 5, in embodiments, control unit 112 can localize wheel units 100, or determine which wheel unit 100 or signal received therefrom is associated with which tire 200 of the vehicle. At 502 the compressed acceleration samples received by control unit 112 from wheel unit(s) 100 can be decompressed. At 504, signal processing, such as filtering, interpolating and/or resampling, among other tasks, can be carried out. At 506, data from wheel unit 100 can be correlated with that received from another vehicle system, such as the ABS. For example, TPMS acceleration samples from a wheel unit 100 can be correlated with the data from all fixed wheel rotation. Wheel unit 100 is then assigned to the wheel for which the direct correlation provides the best result.

In one embodiment, TPMS acceleration samples are received at control unit 112 at time t1. The acquisition time of the first acceleration sample, denoted by t0, is computed via t1 minus the time delay for transmission, minus time delay for processing, and minus the time delay for acquisition. In embodiments, all time delays are known.

In an example embodiment, data from fixed wheel rotation sensors is available in the form of counter values that correspond to the rotational angles of the wheels. In other embodiments, some other form of data is available from the fixed wheel rotation sensors. Each counter value has a time stamp. During one complete rotation of a wheel, a counter counts from zero to M−1, wherein M is the number of teeth of the pulse wheel. The mapping between counter value and angular position of the wheel is generally unknown. In other words, no phase reference exists. Thus, data from fixed wheel rotation sensors within a time window is available in the form of sequences of counter values with corresponding time stamps. Because a correlation is performed, these sequences cover a time window larger than the time window covered by the TPMS acceleration samples. Finally, the sequences of counter values are transformed to sequences of phase angles and the sine of each phase angle is computed. These resulting sequences are then correlated with the received acceleration samples.

In another embodiment, control unit 112 can use additional parameters, such as speed and/or acceleration of the vehicle, to obtain improved correlation results. The acceleration samples also can be used in embodiments as an input to an algorithm that estimates phase and frequency of the oscillation. The estimated phase and frequency are used for correlation with the ABS data.

Advantages include that control unit 112 can afford much higher processing power than wheel unit 100. Thus, much more sophisticated signal processing algorithms can be applied. Furthermore, the acceleration samples can be directly correlated to the data from the fixed wheel rotation sensors. This means that there exists no intermediate step in which information can be lost or corrupted, in contrast with conventional approaches in which acceleration samples are already processed in wheel unit 100. For example, wheel unit 100 is then configured to transmit the sensor data at a predefined rotational angle. This angular synchronization is then used for tire localization.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A control unit comprising:
   a data input to receive wheel rotation data from each of a plurality of fixed wheel rotation sensors associated with a wheel of a vehicle and data including acceleration samples from a plurality of wheel units,
   a processor to localize each of the plurality of wheel units to a particular wheel of the vehicle from a joint processing of the wheel rotation data and the acceleration samples.

2. The control unit of claim 1, wherein the plurality of fixed wheel rotation sensors are part of an antilock braking system (ABS).

3. The control unit of claim 1, wherein the plurality of fixed wheel rotation sensors are part of an electronic stability control (ESC) system.

4. The control unit of claim 1, wherein the control unit is configured to register a time of reception of the data including the acceleration samples.

5. The control unit of claim 4, wherein the control unit further receives information identifying a processing time from the wheel unit, and wherein the control unit is configured to perform the joint processing based on a subtraction of the processing time from the time of reception.

6. The control unit of claim 1, wherein the joint processing includes a rotational angle of a wheel determined from the wheel rotation data and a corresponding acceleration sample from the acceleration data acquired by the acceleration sensor.

7. The control unit of claim 1, wherein the wheel rotation data includes a sequence of rotation values and wherein the control unit is configured to perform a correlation of the acceleration samples with the sequence of rotation values.

8. The control unit of claim 7, wherein the sequence of rotation values includes rotation values within a time window that is larger than a time window associated with the acceleration samples.

9. The control unit of claim 8, wherein the sequence of rotation values includes a sequence of counter values.

10. A wheel unit device comprising:
    an accelerometer to acquire acceleration samples;
    a communication unit to transmit data including the acceleration samples and process time information to a control unit for correlation with data from a fixed wheel rotation sensor, wherein the process time information is related to a processing time within the wheel unit between an end of acquisition of the acceleration sample and the data transmission.

11. The wheel unit device of claim 10, wherein the transmitted data further includes temperature information.

12. The wheel unit device of claim 10, wherein a sampling period for sampling the acceleration samples is determined based on a criteria that an oscillating signal part is observed in the acceleration samples.

13. The wheel unit device of claim 10, wherein the wheel unit device is configured to determine a sampling period for acquisition of the at least one acceleration sample.

14. The wheel unit device of claim 13, wherein the sampling period is determined from a centrifugal acceleration sample.

15. The wheel unit device of claim 13, wherein the sampling period is determined from a sampling chirp comprising a plurality of centrifugal acceleration samples.

16. The wheel unit device of claim 10, wherein the wheel unit device is configured to compress the acceleration samples.

17. The wheel unit device of claim 10, wherein the wheel unit device is configured to process a current acceleration sample based on a subtraction of previous acceleration sample.

* * * * *